US009596468B2

(12) United States Patent
Neff et al.

(10) Patent No.: US 9,596,468 B2
(45) Date of Patent: Mar. 14, 2017

(54) SYSTEM AND METHOD FOR TRANSFERRING DATA

(71) Applicant: III Holdings 2, LLC, Wilmington, DE (US)

(72) Inventors: Ralph Neff, San Diego, CA (US); Ajay Rajagopal Iyer, San Diego, CA (US); Russell Hayashida, San Diego, CA (US); Osama Al-Shaykh, San Diego, CA (US)

(73) Assignee: III HOLDINGS 2, LLC, Wilmington, DE (US)

( * ) Notice: Subject to any disclaimer, the term of this patent is extended or adjusted under 35 U.S.C. 154(b) by 5 days.

(21) Appl. No.: 14/321,463

(22) Filed: Jul. 1, 2014

(65) Prior Publication Data
US 2014/0314155 A1 Oct. 23, 2014

Related U.S. Application Data

(63) Continuation of application No. 11/483,036, filed on Jul. 7, 2006, now abandoned.
(Continued)

(51) Int. Cl.
*G06F 15/16* (2006.01)
*H04N 19/85* (2014.01)
*H04L 29/06* (2006.01)

(52) U.S. Cl.
CPC ... *H04N 19/00903* (2013.01); *H04L 65/1003* (2013.01); *H04L 65/602* (2013.01);
(Continued)

(58) Field of Classification Search
CPC ... H04L 65/60; H04L 65/602; H04L 65/1069; H04L 65/4046; H04L 65/403; H04L 69/24; H04N 19/85
See application file for complete search history.

(56) References Cited

U.S. PATENT DOCUMENTS 5,473,691 A * 12/1995 Menezes et al. ............ 713/161
5,978,014 A * 11/1999 Martin et al. ............ 348/14.08
(Continued)

FOREIGN PATENT DOCUMENTS

EP 1077565 2/2001
GB 2351414 12/2000
(Continued)

OTHER PUBLICATIONS

European Search Report for EP 06786655, dated May 27, 2009 (7 pages).
(Continued)

*Primary Examiner* — Nam Tran
(74) *Attorney, Agent, or Firm* — McAndrews, Held & Malloy, Ltd.

(57) ABSTRACT

A system and a method transmit data in a first codec from a first terminal to a second terminal. The first terminal establishes a connection with the second terminal and/or transmits, transfers and/or sends the data to the second terminal via the connection between the first terminal and the second terminal. The connection between the first terminal and the second terminal has a first channel and/or a second channel to transmit the data from the first terminal to the second terminal. The first terminal transmits the data in a first codec to the second terminal via the first channel and/or the second channel of the connection without receiving capabilities of and/or intentions from the second terminal. The second terminal may be incapable of receiving, of processing, of accepting and/or of displaying the data in the first codec. The capabilities of and/or the intentions from the second terminal is transmitted to the first terminal via the connection. The first terminal switches the data from the first codec to the second codec and/or transmits the data in the second codec
(Continued)

to the second terminal via the connection between the first terminal and the second terminal.

23 Claims, 3 Drawing Sheets

Related U.S. Application Data

(60) Provisional application No. 60/698,107, filed on Jul. 11, 2005.

(52) U.S. Cl.
CPC ............. *H04L 69/24* (2013.01); *H04N 19/85* (2014.11); *H04L 65/1069* (2013.01); *H04L 65/4046* (2013.01); *H04L 65/4092* (2013.01); *H04L 65/60* (2013.01)

(56) References Cited

U.S. PATENT DOCUMENTS

| | | | |
|---|---|---|---|
| 6,167,092 A | 12/2000 | Lengwehasatit | |
| 6,175,856 B1* | 1/2001 | Riddle | 709/204 |
| 6,498,865 B1 | 12/2002 | Brailean et al. | |
| 6,529,552 B1 | 3/2003 | Tsai et al. | |
| 6,804,717 B1 | 10/2004 | Bakshi et al. | |
| 6,826,272 B1* | 11/2004 | Dalrymple et al. | 370/237 |
| 6,856,612 B1* | 2/2005 | Bjelland et al. | 370/338 |
| 7,006,631 B1 | 2/2006 | Luttrell et al. | |
| 7,170,988 B2* | 1/2007 | Gibbs et al. | 370/467 |
| 2002/0181495 A1 | 12/2002 | Requena et al. | |
| 2003/0067872 A1 | 4/2003 | Harrell et al. | |
| 2003/0093267 A1 | 5/2003 | Leichtling et al. | |
| 2003/0142744 A1 | 7/2003 | Wu et al. | |
| 2003/0219006 A1 | 11/2003 | Har | |
| 2004/0158645 A1 | 8/2004 | Morinaga et al. | |
| 2004/0174817 A1 | 9/2004 | Jabri et al. | |
| 2004/0193762 A1 | 9/2004 | Leon et al. | |
| 2004/0218673 A1 | 11/2004 | Wang et al. | |
| 2005/0008030 A1 | 1/2005 | Hoffmann et al. | |
| 2006/0013148 A1 | 1/2006 | Burman et al. | |
| 2006/0029041 A1 | 2/2006 | Jabri et al. | |
| 2006/0056416 A1 | 3/2006 | Yang et al. | |
| 2006/0159037 A1 | 7/2006 | Jabri et al. | |
| 2006/0176877 A1 | 8/2006 | Jabri et al. | |
| 2007/0011277 A1 | 1/2007 | Neff et al. | |
| 2007/0076756 A1 | 4/2007 | Chan et al. | |
| 2007/0112935 A1 | 5/2007 | Espelien | |
| 2007/0156770 A1 | 7/2007 | Espelien | |
| 2007/0186003 A1 | 8/2007 | Foster et al. | |
| 2007/0189275 A1 | 8/2007 | Neff | |
| 2007/0220555 A1 | 9/2007 | Espelien | |
| 2007/0226315 A1 | 9/2007 | Espelien | |
| 2007/0233701 A1 | 10/2007 | Sherwood et al. | |

FOREIGN PATENT DOCUMENTS

| | | |
|---|---|---|
| JP | H0685933 | 3/1994 |
| JP | 2001197247 | 7/2001 |
| JP | 2002232507 | 8/2002 |
| JP | 2003169164 | 6/2003 |
| JP | 2005080164 | 3/2005 |
| WO | 0047006 | 8/2000 |
| WO | 2007008695 | 1/2007 |

OTHER PUBLICATIONS

International Search Report for PCT/US06/26573, dated Jul. 13, 2007 (3 pages).
Written Opinion for PCT/US06/26573, dated Jul. 13, 2007 (7 pages).

* cited by examiner

| Codec | LCN | MuxCode | Multiplex Table Entry |
|---|---|---|---|
| (H.245 control) | 0 | 0 | {0UCF} |
| AMR | 1 | 1 | {1UCF} |
| h.263 | 2 | 2 | {2UCF} |
| MPEG-4 | 3 | 3 | {3UCF} |
| H.264 | 4 | 4 | {4UCF} |
| AMR-WB | 5 | 5 | {5UCF} |
| Other Accelerated Control Negotiation Protocol | 6 | 6 | {6UCF} |

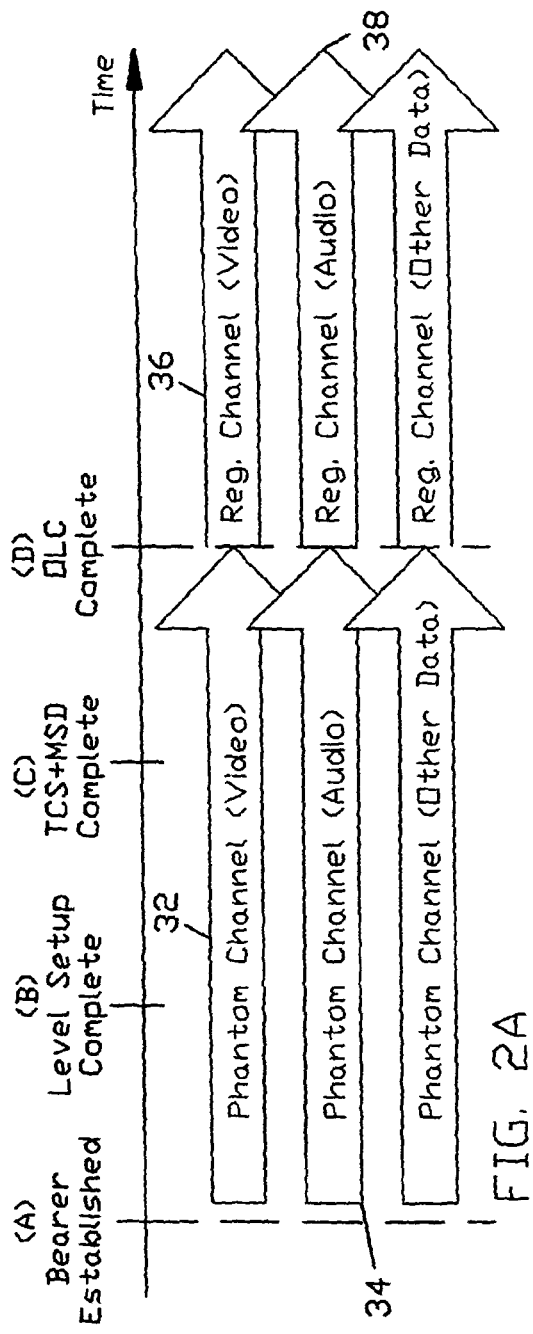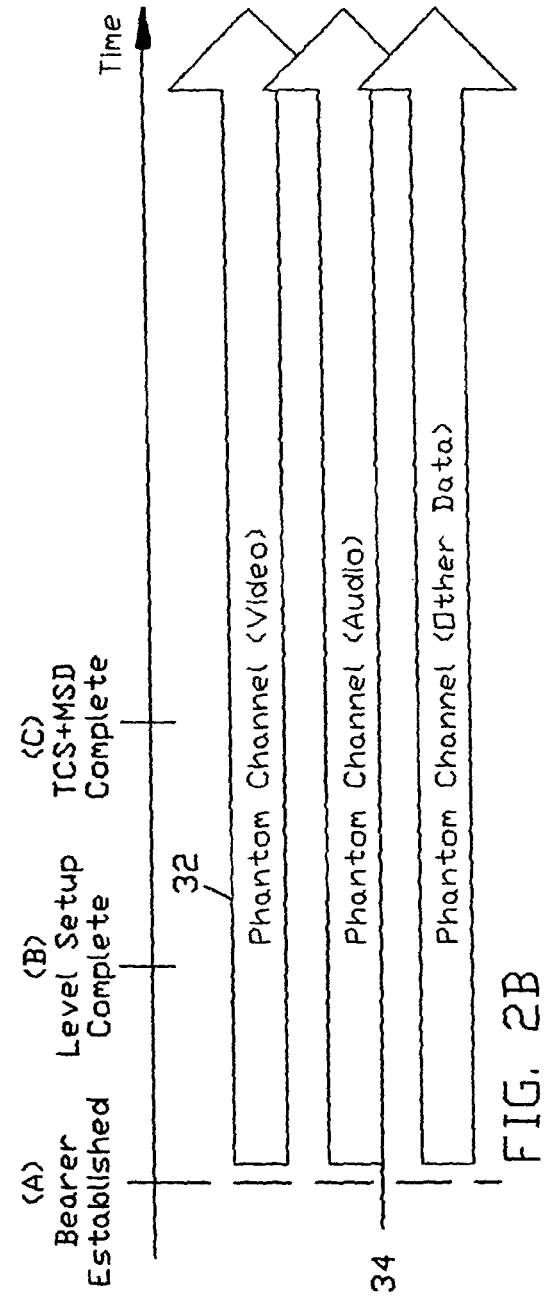

SYSTEM AND METHOD FOR TRANSFERRING DATA

PRIORITY CLAIM

This application is a continuation application of U.S. Non-Provisional application Ser. No. 11/483,036 filed Jul. 7, 2006 which claims the benefit of U.S. Provisional Application Ser. No. 60/698,107 filed Jul. 11, 2005.

BACKGROUND OF THE INVENTION

The present invention generally relates to a system and a method for transferring data. More specifically, the present invention relates to a system and a method for transferring data from a first terminal to a second terminal. The data may be transferred from the first terminal to the second terminal after a connection between the first terminal and the second terminal may be established. The first terminal may transfer and/or may transmit the data in a first codec to the second terminal without an exchange of capabilities and/or intents of the first terminal and the second terminal. The capabilities of the second terminal may not support, may not process and/or may not accept the data in the first codec. The exchange of capabilities and/or intents of the first terminal and the second terminal may be transferred and/or may be transmitted between the first terminal and the second terminal.

The first terminal may transfer and/or may transmit the data in a second codec to the second terminal based upon the exchange of capabilities and intents of the first terminal and/or the second terminal. The data in the second codec which may be supported, may be processed, may be accepted and/or may be displayed by the second terminal. As a result, the system and the method may establish a call setup between the first terminal and the second terminal to transfer data in a first codec and/or a second codec.

It is generally known, for example, that mobile devices, such as, for example, a first terminal and a second terminal may conduct a video conference to communicate and/or to transmit multimedia or other data between the first terminal and the second terminal via 3G-324M standard protocol. Such data may consist of audio, video, and/or other data types. Traditionally, the 3G-324M protocol enabled mobile device, may be, for example, a 3G mobile telephone, personal digital assistant (hereinafter "PDA"), laptop computer and/or the like. The first terminal may transmit data in one or more of several possible codec formats to a second terminal during the video conference. Prior to transmitting the data from the first terminal to the second terminal, a first message must be exchanged between the first terminal and the second terminal. The first message is a terminal capability set (hereinafter "TCS") message which is sent from the second terminal to the first terminal. The TCS message identifies a version of a control protocol, such as, for example, H.245 which is used by the second terminal and/or capabilities of the second terminal. The first terminal determines the version of the control protocol and/or the capabilities of the second terminal from the TCS message. As a result, the first terminal determines which codec or codecs to use when transmitting data to the second terminal.

A second message must also be exchanged between the first terminal and the second terminal prior to the transmission of the data from the first terminal to the second terminal. The second message may be a master/slave determination (hereinafter "MSD") message which is transmitted from the second terminal to the first terminal. Information from this second message may be used as part of the subsequent channel negotiation to determine which codec or codecs will be used to transmit data from the first terminal to the second terminal. A transmission channel, such as, for example, an open logical channel (hereinafter "OLC") is established between the first terminal and the second terminal after the first terminal receives and/or processes the first message and the second message. As a result, the data in the first codec or in the second codec may be transmitted from the first terminal to the second terminal via the transmission channel using codecs which are acceptable to the second terminal.

However, the first terminal will not transmit the data to the second terminal without receiving the first message and the second message from the second terminal. Still further, the transmission channel between the first terminal and the second terminal will not be established until the first terminal receives, accepts and/or processes the first message and the second message from the second terminal. Moreover, a duration of a setup time to complete transmission of the data from the first terminal to the second terminal is extended by and/or based on durations of times for transmitting the first message and the second message from the second terminal to the first terminal and/or for negotiating and establishing specific transmission channels between the first terminal and the second terminal. The initial exchange of capabilities and intents used commonly in such terminals may result in a lengthy call setup period before multimedia and other valuable data may be exchanged.

It may be possible to compress the capabilities, preferences and intents of terminals 12a and 12b such that they are exchanged between terminals 12a and 12b in a single message or in a series of pipelined messages which do not require interaction or acknowledgment from the remote side. In such a case, the duration of time before media may be exchanged between terminals 12a and 12b will depend on the time required to convey such messages between the terminals. Such messages are typically delivered in a reliable fashion, and so any adverse channel conditions or channel errors may extend the delivery time and so result in a lengthy delay before multimedia or other valuable data may be exchanged.

A need, therefore, exists for a system and a method for transmitting data from the first terminal to the second terminal without waiting for the initial exchange of capabilities and intents. Further, a need exists for a system and a method for transmitting data from the first terminal to the second terminal which minimizes the time expended before such valuable data may be transmitted and received.

SUMMARY OF THE INVENTION

The present invention relates to a system and a method for transmitting data. More specifically, the present invention relates to a system and a method for transmitting data between a first terminal and a second terminal. The first terminal may transmit, may transfer and/or may send the data to the second terminal upon establishment of a connection between the first terminal and the second terminal. The connection between the first terminal and the second terminal may have one or more channels for transmitting the data from the first terminal to the second terminal. The first terminal may transmit the data to the second terminal via these channels without receiving capabilities of and/or intentions from the second terminal. For each relevant data type, a first codec may be chosen with which to transmit the data on a first channel. The second terminal may be capable of receiving, of processing, of accepting and/or of displaying the data in the first codec, in which case it may utilize the data immediately upon receiving it. Alternately, the second terminal may be incapable of receiving, of processing, of accepting and/or of displaying the data in the first codec. Upon discovering this, the first terminal may switch the outgoing data transmission from the first codec to a second codec of which the second terminal receives, processes, accepting and displays the data. The first terminal may then transmit the data in the second codec to the second terminal via a second channel on connection between the first terminal and the second terminal.

In an embodiment of the present invention, a system for transmitting data wherein the data is audio signals, video signals and/or other data signals is provided. The system has a network which transmits the data wherein the network is wireless and a first terminal connected to the network wherein the first terminal receives and transmits the data via the network. Further, the system has a second terminal connected to the network wherein the second terminal communicates with the first terminal via the network wherein the second terminal is located remotely with respect to the first terminal. Still further, the system has a digital table accessible by the first terminal wherein the digital table is predefined with a plurality of codecs wherein a first codec and a second codec are identified by the first terminal from the plurality of codecs in the digital table wherein a number is assigned to each codec of the plurality of codecs wherein a number assigned to the first codec is different than a number assigned to the second codec. Moreover, the system has a first channel which connects the first terminal and the second terminal via the network wherein the first terminal transmits the data in the first codec to the second terminal via the first channel wherein the second terminal displays the data in the first codec and/or transmits a message to the first terminal wherein the message identifies the second codec which is acceptable by the second terminal.

In an embodiment, the system has a second channel established between the first terminal and the second terminal wherein the data in the second codec is transmitted via the second channel.

In an embodiment, the system has a standard stuffing sequence connected to the message transmitted from the second terminal wherein the first terminal determines the second codec via the standard stuffing sequence.

In an embodiment, the system has a header connected to the message transmitted from the second terminal wherein the header identifies the second codec which is acceptable by the second terminal.

In an embodiment, the system has a third codec from the plurality of codecs within the digital table wherein the first terminal transmits the data to the second terminal in the third codec.

In an embodiment, the system has a video conference between the first terminal and the second terminal via the first channel wherein the media data exchanged between the terminals is displayed by the first terminal and the second terminal.

In an embodiment, the message transmitted by the second terminal is a terminal capability set message.

In an embodiment, the first codec or the second codec is one of an adaptive multi-rate codec, an H.263 codec, an H.264 codec, adaptive multi-rate wideband codec, accelerated control/negotiation protocol or a moving picture experts group four visual codec.

In another embodiment of the present invention, a method for transmitting data wherein the data is audio signals and/or video signals is provided. The method has the step of providing a network that connects a first terminal and a second terminal wherein the first terminal and the second terminal communicate via the network wherein the second terminal is located remotely with respect to the first terminal. Further, the method has the step of establishing a connection between a first terminal and a second terminal over the network wherein a first channel is opened between the first terminal and the second terminal via the connection wherein the data is transmittable between the first terminal and the second terminal via the first channel over the network wherein the first channel is opened without identifying codec capabilities of the first terminal and the second terminal. Still further, the method has the step of transmitting data from the first terminal to the second terminal via the first channel wherein the data is transmitted in a first codec without exchanging the codec capabilities of the second terminal wherein the first codec is selected from a plurality of codecs by the first terminal wherein the first codec corresponds to the codec capabilities of the first terminal. Moreover, the method has the step of displaying the data in the first codec via the second terminal without exchanging codec capabilities of the first terminal or the second terminal wherein the first codec corresponds to the codec capabilities of the second terminal wherein the second terminal communicates a transmission to the first terminal via the connection.

In an embodiment, the method has the step of transmitting a message from the second terminal to the first terminal via the transmission wherein the message identifies the codec capabilities of the second terminal.

In an embodiment, the method has the step of identifying a second codec for transmitting the data via the transmission from the second terminal wherein the first terminal transmits the data in the second codec to the second terminal.

In an embodiment, the method has the step of opening a second channel between the first terminal and the second terminal via the connection wherein the second channel corresponds to the codec capabilities of the first terminal and the second terminal.

In an embodiment, the method has the step of transmitting the data in a second codec from the first terminal to the second terminal wherein the second codec corresponds to the codec capabilities of the first terminal and the second terminal.

In an embodiment, the method has the step of replacing the first channel with a second channel between the first terminal and the second terminal wherein the second channel corresponds to the codec capabilities of the first terminal and the second terminal.

In an embodiment, the method has the step of transmitting a standard stuffing sequence with a header or without a header to the first terminal via the transmission from the second terminal wherein the first terminal identifies the codec capabilities of the second terminal from the transmission.

In an embodiment, the network is wireless.

In another embodiment of the present invention, a method for transmitting data in a first codec or in a second codec wherein the data is an audio signal and/or a video signal wherein the first codec or the second codec is selected from a plurality of codecs is provided. The method has the step of providing a network which connects a first terminal and a second terminal wherein the second terminal is located remotely with respect to the first terminal wherein the first terminal and the second terminal communicate via the network. Further, the method has the step of assigning a code to each codec of the plurality of codecs wherein the code assigned to the first codec is different than the code assigned to the second codec wherein each codec of the plurality of codecs corresponds to codec capabilities of the first terminal. Still further, the method has the step of selecting the first codec from the plurality of codecs without an exchange of the codec capabilities of the first terminal and the second terminal wherein the first codec corresponds to the codec capabilities of the first terminal wherein the first terminal selects the first codec by identifying the code assigned to the first codec. Moreover, the method has the step of transmitting the data in the first codec from the first terminal to the second terminal via a first channel over the network wherein the first channel is opened between the first terminal and the second terminal without the exchange of the codec capabilities of the second terminal. Furthermore, the method has the step of transmitting a communication from the second terminal to the first terminal via the network wherein the codec capabilities of the second terminal are determinable by the first terminal via the communication from the second terminal.

In an embodiment, the method has the step of transmitting a message from the second terminal to the first terminal via the communication wherein the message identifies the codec capabilities of the second terminal.

In an embodiment, the method has the step of transmitting the data in the second codec from the first terminal to the second terminal wherein the second codec corresponds to the codec capabilities of the second terminal.

In an embodiment, the method has the step of opening a second channel between the first terminal and the second terminal via the network wherein the first terminal transmits the data in the second codec to the second terminal via the second channel.

In an embodiment, the method has the step of selecting the second codec from the plurality of codecs wherein the second codec corresponds to the codec capabilities of the first terminal and the second terminal and further wherein the first terminal selects the second codec by identifying the code assigned to the second codec.

In an embodiment, the method has the step of opening a second channel between the first terminal and the second terminal via the network wherein the second channel corresponds to the codec capabilities of the first terminal and the second terminal.

In an embodiment, the method has the step of transmitting a terminal capability message and a master/slave determination message from the second terminal to the first terminal via the communication wherein the first terminal identifies the codec capabilities of the second terminal via the communication.

In an embodiment, the method has the step of switching from the data in the first codec to the data in the second codec wherein the first terminal transmits the data in the second codec to the second terminal via the network.

In an embodiment, the method has the step of arranging the plurality of codecs into a chart wherein the chart is accessible by the first terminal and the second terminal wherein the first codec is selected by the code assigned to the first codec or the second codec.

It is, therefore, an advantage of the present invention to provide a system and a method for transmitting data which may provide a first terminal for transmitting the data to a second terminal without receiving capabilities and/or intentions from the second terminal.

Another advantage of the present invention is to provide a system and a method for transmitting data which may transmit data between one or more 3G-324M protocol enabled mobile devices.

And, another advantage of the present invention is to provide a system and a method for transmitting data which may provide an abstract syntax notation one message to relay a codec capability and/or a codec preference of a first terminal to a second terminal.

Yet another advantage of the present invention is to provide a system and a method for transmitting data which may utilize indices of a predefined table to indicate a codec capability and/or a codec preference of a first terminal to a second terminal.

A further advantage of the present invention is to provide a system and a method for transmitting data which may embed capability structures of control protocol into a message to indicate a codec capability and/or a codec preference of a first terminal to a second terminal.

Moreover, an advantage of the present invention is to provide a system and a method for transmitting data which may determine a codec for transmitting the data from a first terminal to a second terminal without knowledge of the codec capabilities of the second terminal.

And, another advantage of the present invention is to provide a system and a method for transmitting data which may utilize a terminal capability set and/or a master/slave determination to determine a second codec to be used in cases where the first codec assumption proves to be inappropriate for data transmission between the first terminal and the second terminal.

Yet another advantage of the present invention is to provide a system and a method for transmitting data which may send and/or may transmit the data from a first terminal to a second terminal without completing a H.245 logical channel negotiation between the first terminal and the second terminal.

Another advantage of the present invention is to provide a system and a method for transmitting data which may utilize standard H.245 negotiation, improved H.245 negotiation methods, such as, for example, WNSRP and/or other enhanced channel negotiation methods to determine a second codec to be used in cases where the first codec assumption proves to be inappropriate for data transmission between the first terminal and the second terminal.

Yet another advantage of the present invention is to provide a system and a method for transmitting data which may transmit the data in a message sent from a first terminal to a second terminal.

A still further advantage of the present invention is to provide a system and a method for transmitting data which may utilize one or more channels to transfer, to transmit and/or to send the data from a first terminal to a second terminal.

Moreover, an advantage of the present invention is to provide a system and a method for transmitting data which may determine a codec of the data that may be acceptable by a first terminal and/or a second terminal.

And, another advantage of the present invention is to provide a system and a method for transmitting data which may send and/or may transmit codec capabilities and/or intentions of a first terminal to a second terminal to indicate the acceptability of a codec of the first terminal.

Yet another advantage of the present invention is to provide a system and a method for transmitting data which may transmit, may send and/or may transfer the data from a first terminal to a second terminal upon establishment of a bearer.

Moreover, an advantage of the present invention is to provide a system and a method for transmitting data which may provide a first terminal and/or a second terminal to support one or more of the following: an adaptive multi-rate codec, an adaptive multi-rate wide-band codec, an adaptive multi-rate wide-band plus codec, an H.263 codec, an H.264 codec, a moving picture experts group four visual codec.

And, another advantage of the present invention is to provide a system and a method for transmitting data which may provide a first terminal to switch from a first codec of the data to a second codec of the data for transmitting the data to a second terminal.

Yet another advantage of the present invention is to provide a system and a method for transmitting data which may provide a first terminal to determine a codec capability of a second terminal for transmitting, for sending and/or for transferring the data to the second terminal.

Another advantage of the present invention is to provide a system and a method for transmitting data which may provide a call setup for transferring the data to a legacy terminal.

Additional features and advantages of the present invention are described in, and will be apparent from, the detailed description of the presently preferred embodiments and from the drawings.

BRIEF DESCRIPTION OF THE DRAWINGS

FIG. 2A illustrates a time-line for transmission of data in an embodiment of the present invention.

FIG. 2B illustrates a time-line for transmission of data in an embodiment of the present invention.

DETAILED DESCRIPTION OF THE PREFERRED EMBODIMENTS

The present invention relates to a system and a method for transmitting data between a first terminal and a second terminal via a connection which may consist of one or more channels. The first terminal and the second terminal may communicate and/or may be connected via the connection. A bearer establishment of the connection may be identified by the first terminal and/or the second terminal. The data in a first codec may be transmitted, may be transferred, may be sent from the first terminal to the second terminal without an exchange of codec capabilities and/or codec preferences of the second terminal between the first terminal and the second terminal. The second terminal may be capable of receiving, of accepting, of processing, and/or of displaying the data in the first codec. As a result, the second terminal may utilize the data upon receiving the data. Alternately, the second terminal may be incapable of receiving, of accepting, of processing and/or of displaying the data in the first codec. The first terminal may identify a second codec which may be acceptable by the second terminal. The first terminal may use capability information and preference information sent from the second terminal to the first terminal to determine the second codec. The first terminal may alter and/or may change transmission to switch from the first codec to the second codec. The first terminal may transmit, may transfer and/or may send the data in the second codec to the second terminal via the connection. As a result, the second terminal may accept, may receive, may process, may display and/or may disseminate the data in the second codec.

Figures 1, 4:
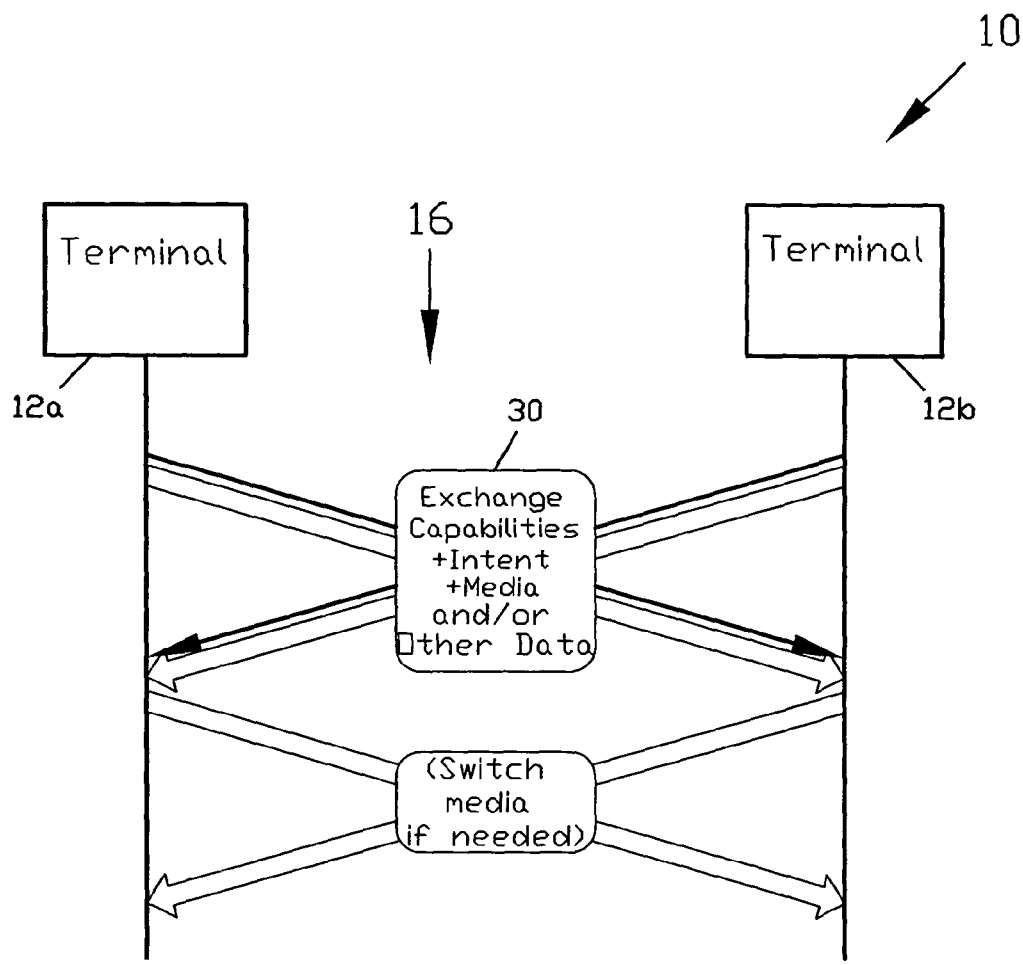
FIG. 1 illustrates an information exchange used by a system in an embodiment of the present invention.
FIG. 4 illustrates a table of codecs for a system in an embodiment of the present invention.

Referring now to the drawings wherein like numerals refer to like parts, FIG. 1 illustrates system 10 which may have a first terminal 12a and a second terminal 12b for transferring data. The data may be, for example, an audio signal, a video signal, an accelerated call negotiation protocol, a data stream and/or the like. The first terminal 12a may be connected to and/or may be in communication with the second terminal 12b. The first terminal 12a and/or the second terminal 12b may be, for example, a computer terminal, a mobile device and/or an electronic device which may be capable of transmitting, of receiving, of processing, of accepting and/or of displaying the data formatted in a codec. Further, the mobile device may be, for example, a 3G mobile device, an internet protocol (hereinafter "IP") video cellular telephone, a PDA, a laptop computer and/or the like. It should be understood that the first terminal 12a and/or the second terminal 12b may be any terminal capable of transmitting, capable of receiving and/or capable of processing the data in the codec known to one having ordinary skill in the art.

The first terminal 12a and/or the second terminal 12b may conduct and/or may transmit a video conference and/or an audio-visual communication on a data communication network 16 (hereinafter, "the network 16") via a transmission protocol, such as, for example, an H.320 protocol, an H.323 protocol, an H.324 protocol and/or a 3G-324M protocol. The first terminal 12a and/or the second terminal 12b may transmit, may deliver, may receive and/or may process a control/transmission message 30 in a control protocol, such as, for example, an H.245 protocol over the network 16. The network 16 may have one or more channels connecting the terminals 12a, 12b. The data, the video signal, the audio signal, the accelerated call negotiation protocol stream and/or the data stream may be transited between the terminals 12a, 12b via one or more channels of the network 16.

The control/transmission message 30 may open and/or may close one or more logical channels for the audio signal, the video signal, the accelerated call negotiation protocol stream and/or the data stream. The control/transmission message 30 may indicate one or more codec capabilities, codec preferences and/or intentions of the first terminal 12a and/or the second terminal 12b. The first terminal 12a and/or the second terminal 12b may utilize a retransmission protocol, for example, a WNSRP protocol for delivering and/or for accepting the control/transmission messages 30 over the network 16. The retransmission protocol may permit more than one control/transmission message 30 to be delivered to the first terminal 12a or the second terminal 12b without an acknowledgment of the control/transmission message from the first terminal 12a or the second terminal 12b, respectively. It should be understood that the first terminal 12a and/or the second terminal 12b may be any terminal capable of transmitting, capable of receiving and/or capable of processing the control/transmission messages 30 in the control protocol known to one having ordinary skill in the art.

The first terminal 12a and/or the second terminal 12b of the system 10 may represent, may transmit, may encode and/or may decode the data and/or information in an abstract syntax, such as, for example, an abstract syntax notation one (hereinafter "ASN.1"). The data and/or information in the control/transmission message 30 may be represented in, may be transmitted in, may be encoded with, and/or may be decoded with the abstract syntax. The first terminal 12*a* and/or the second terminal 12*b* may utilize the control/transmission message 30 in the abstract syntax to relay the codec capabilities and/or the codec preferences of first terminal 12*a* and/or the second terminal 12*b*.

As illustrated in FIG. 1, the terminals 12*a*, 12*b* in system 10 may begin to transmit data upon establishment of the bearer, without completing a separate capabilities stage and/or intent stage. The data transmission may begin before, may begin after, or may begin concurrently with the transmission of capabilities and intent information.

As illustrated in a table in FIG. 4, the terminals 12*a*, 12*b* in system 10 may utilize one or more indices of a predefined table to represent the codec capability and/or the codec preference and/or other codec and multiplex configuration information to be used when transferring data between terminals 12*a*, 12*b*. The use of the predefined table information may postpone or eliminate the requirement of receiving capability information, preference information and/or configuration information via the control/transmission messages 30. Each codec represented in the table in FIG. 4 may have, for example, a corresponding logical channel number, a multiplexing code and/or a multiplex table entry. Each codec in the table in FIG. 4 may correspond to and/or may be assigned a coding standard, such as, for example, an H.245 control standard, an H.263 standard, an H.264 standard, moving picture experts group four (hereinafter "MPEG-4") standard, an adaptive multi-rate (hereinafter "AMR") standard, an AMR wide-band (hereinafter "AMR-WB") standard and/or an accelerated call negotiation protocol standard. As illustrated in the table in FIG. 4, the H.245 control codec, the AMR codec, the H.263 codec, the MPEG-4 codec, the H.264 codec, the AMR-WB and the accelerated call negotiation protocol standard may have corresponding multiplex table entries of 0, 1, 2, 3, 4, 5 and 6, respectively. Each codec in the table in FIG. 4 may be utilized by system 10 to establish a pre-defined, pre-negotiated phantom channel (hereinafter "phantom channel") for transmitting the data between the terminals 12*a*, 12*b*.

The codecs in the table in FIG. 4 may have associated codec configuration information and/or H.223 configuration information. The codec configuration of the AMR codec may have, for example, a max bit rate of 12.2 kbit/s. The codec configuration of the AMR codec may have, for example, a max AL-SDU-Frames equal of one. The H.223 configuration of the AMR code, for example, an adaptation layer type with sequence numbers. The H.223 configuration may be, for example, non-segmentable.

The codec configuration of the H.263 codec may support, for example, a Quarter Common Intermediate Format (hereinafter "QCIF"). The codec configuration of the H.263 codec may have, for example, a QCIF Minimum Picture Interval (hereinafter "MPI") of two which may be expressed in units of 1/30 sec. Additionally, the codec configuration of the H.263 codec may have, for example, a maximum bit rate of sixty-four kbits/s. Further, the codec configuration of the H.263 codec may have, for example, parameters for unrestricted vector, arithmetic coding, advanced prediction, pb frames and/or temporal spatial tradeoff capability equal to false. The codec configuration of the H.263 codec may conform to H.263 baseline.

The codec configuration of the MPEG-4 codec may support, for example, the QCIF. The codec configuration of the MPEG-4 codec may have, for example, a max bite rate of sixty-four kbits/s. Further, the codec configuration of the MPEG-4 codec may have, for example, a profile and level indication set to eight. Still further, the codec configuration of the MPEG-4 codec may have, for example, an object id set to one. Moreover, the codec configuration of the MPEG-4 codec may have, for example, decoder configuration information as follows: "00-00-01-b0-00-00-01-b5-09-00-00-01-20-00-84-5d-4c-28-2c-20-90-a2-8f". The H.223 configuration of the MPEG-4 codec may have, for example, control field octets set to two. Further, the H.223 configuration of the MPEG-4 codec may have, for example, a send buffer size of one-thousand and twenty-four.

The H.223 configuration of the H.264 codec may have, for example, control field octets set to two. Further, the H.223 configuration of the H.264 codec may have, for example, a send buffer size of 1024.

The H.223 configuration of the AMR-WB codec may have, for example, an adaptation layer type of AL2 with sequence numbers. The H.223 configuration of the AMR-WB codec may be, for example, non-segmentable.

As illustrated in FIG. 1, the first terminal 12*a* and/or the second terminal 12*b* may communicate via the control/transmission message 30 over the network 16 using one or more channels. The control message 30 may contain the codec capability, the codec preference and/or the intention of the first terminal 12*a* and/or the second terminal 12*b*. The control/transmission message 30 may contain capabilities of the terminals 12*a*, 12*b*, intent of the terminals 12*a*, 12*b* and/or the data and/or media between the terminals 12*a*, 12*b*. The control/transmission message 30 may contain the data and/or the media which may be formatted and/or may be coded in the first codec.

The control/transmission message 30 may be transmitted and/or may be sent from the first terminal 12*a* to the second terminal 12*b*. The second terminal 12*b* may receive, may accept and/or may process the control/transmission message 30. The control/transmission message 30 may indicate the codec capability of the first terminal 12*a*, the codec preference of the first terminal 12*a*, the intention of the first terminal 12*a* and/or the first codec of the data and/or the media sent from the first terminal 12*a* to the second terminal 12*b*. The second first terminal 12*a* may determine whether the first codec of the data and/or the media may be acceptable by the second terminal 12*b* via receipt of the control/transmission message 30 sent from the second terminal 12*b* to the first terminal 12*a*. The second terminal 12*b* may receive, may accept, may process and/or may display the data and/or the media in the first codec which may be an acceptable codec and/or may be a preferred codec of the second terminal 12*b*. As a result, the call setup time for transmitting the data and/or the media between the terminals 12*a*, 12*b* may be minimized by allowing the data and/or the media to be transmitted upon bearer establishment without waiting for an exchange of capabilities and/or of intents between the terminals 12*a*, 12*b*.

The second terminal 12*b* may be incapable of processing, of receiving, of accepting and/or of dissimilating the first codec of the data and/or the media in the control/transmission message 30. The second terminal 12*b* may transmit the codec capability, the codec preference and/or the intent of the second terminal 12*b* to the first terminal 12*a* via the control/transmission message 30. Further, the second terminal 12*b* may transmit the data and/or the media to the first terminal 12*a* via the control/transmission message 30. The control/transmission message 30 may indicate to the first terminal 12*a* which codec in the table in FIG. 4 may be acceptable by and/or may be preferred by the second terminal 12*b* to transmit the data and/or the media between the terminals 12a, 12b. The first terminal may determine a second codec which may be acceptable by and/or may be preferred by the second terminal 12b. The first terminal 12a may format, may negotiate and/or may switch the data and/or the media from the first codec to the second codec for transmitting the data and/or the media between the terminals 12a, 12b. The first terminal 12a may transmit the data and/or the media in the second codec to the second terminal 12b. The second terminal 12b may receive, may accept, may process and/or may display the data and/or the media in the second codec. As a result, a fallback negotiation between the terminals 12a, 12b may allow the data and/or the media to be transmitted between the terminals 12a, 12b with only a half of round trip nominal delay between the terminals 12a, 12b.

The terminals 12a, 12b may transmit and/or may send the data and/or the media upon establishment of the bearer by selecting one or more default options based on the media to be transmitted between the terminals 12a, 12b. One or more of the default options may be defined for the codecs, the codec configurations, channel configurations, and the multiplex table entries. The terminals 12a, 12b may utilize one or more default options to achieve an audio-visual exchange and/or the teleconferencing.

The data and/or the media which may be transferred between the terminals 12a, 12b without an H.245 channel negotiation may be transferred between the terminals 12a, 12b via at least one phantom channel of the network 16. The phantom channel may be established and/or may be detected by the second terminal 12b which may be receiving the data and/or the media from the first terminal 12a. The phantom channel may terminate upon an establishment of an H.245-negotiated logical channel of the same data and/or media type. The phantom channels may establish a flow of data and/or media between the terminals 12a, 12b which may continue to flow during a normal H.245 call negotiation or a call negotiation using accelerated means.

The terminals 12a, 12b may establish at least one phantom channel and may proceed through the H.245 call setup or through another accelerated call setup procedure. Each phantom channel may be replaced by an established audio logical channel, visual logical channel and/or data logical channel between the terminals 12a, 12b. Alternatively, the system 10 may maintain the phantom channel and/or a logical channel between the terminals 12a, 12b. As a result, the system 10 may avoid the H.245 logical channel negotiation between the terminals 12a, 12b. The second terminal 12b may not support the first codec of the data and/or the media. As a result, the transmission of the data and/or the media in the first codec from the first terminal 12a to the second terminal 12b via at least one phantom channel may not be executed.

Standard stuffing blocks may be interleaved with the data in the control/transmission message 30 for transmitting from the first terminal 12a to the second terminal 12b via the phantom channel. As a result, a legacy terminal may synchronize with the standard stuffing blocks and/or may discard the data and/or the media in the first codec. The first terminal 12a may recognize that the second terminal 12b may not support the first codec, may terminate transmission of the data and/or the media in the first codec and/or may transmit legacy signaling to the second terminal 12b.

Capability information based on the first codec of the data may be added to a H.245 TCS message which may signal to the terminals 12a, 12b that a codec may be supported by the first terminal 12a and/or the second terminal 12b. The capability information may indicate to the first terminal that the second terminal 12b may support the data and/or the media in the first codec received from the first terminal 12a via at least one phantom channel. Alternatively, the capability information may indicate that the first terminal 12a may be required to switch from the first codec to a second codec to establish successful data communication between the terminals 12a, 12b. In such a case, the first terminal 12a may choose a second codec from the table in FIG. 4 or a similar table of defaults, and so may establish a new Phantom Channel using the second codec. Alternately, the first terminal 12a may choose to negotiate and/or establish an H.245 open logical channel (hereinafter "OLC") using the second codec. Negotiation of the H.245 OLC may utilize WNSRP protocol and/or other accelerated call negotiation techniques which may provide speed advantages over basic H.245 OLC negotiation.

FIGS. 2A and 2B illustrate a time-line for connection of the terminals 12a, 12b via a video phantom channel 32 and/or a audio phantom channel 34. The first terminal 12a may begin sending and/or may begin transmitting the data and/or the media which may be interleaved with the standard stuffing block at bearer establishment at point A in FIGS. 2A and 2B. The video phantom channel 32 and/or the audio phantom channel 34 may be acceptable to the second terminal 12b. As a result, the video phantom channel 32 and/or the audio phantom channel 34 between the terminals 12a, 12b may be established to transmit the data and/or the media to the second terminal 12b. A level setup between the terminals 12a, 12b may be completed and/or may be executed at point B in FIGS. 2A and 2B. The TCS and/or the MSD between the terminals 12a, 12b may be completed and/or may be executed at point C in FIGS. 2A and 2B.

The video phantom channel 32 and/or the audio phantom channel may be utilized for transmitting the data from the first terminal 12a to the second terminal 12b until the second terminal 12b may execute, may complete and/or may negotiate the H.245 OLC at point D in FIGS. 2A and 2B. As a result, the video phantom channel 32 and/or the audio phantom channel 34 may be replaced with a negotiated video signal 36 and/or a negotiated audio signal 38 at point D as illustrated in FIG. 2A. Alternatively, the second terminal 12b may not execute and/or may not negotiate the H.245 OLC. As a result, the video phantom channel 32 and/or the audio phantom channel 34 may transmit the data and/or the media from the first terminal 12a to the second terminal 12b during a session of transmission between the terminals 12a, 12b as illustrated in FIG. 2B.

The terminals 12a, 12b may support the first codec and/or may begin transmission of the data and/or the media in the first codec via, for example, a Level 2 transmission or a Level 2 transmission with optional header. The first terminal 12a and/or the second terminal 12b may be capable of receiving the Level 2 transmission and/or the Level 2 transmission with optional header. The first terminal 12a and/or the second terminal 12b may not be capable of receiving the Level 2 transmission with optional header. As a result, the first terminal 12a and/or the second terminal 12b may terminate the Level 2 transmission with optional header. The terminals 12a, 12b may be capable to parse an audio/video (hereinafter "A/V") multiplexing (hereinafter "Mux") protocol data unit (hereinafter "PDU") to remove the optional header from the Level 2 transmission.

Figure 3:
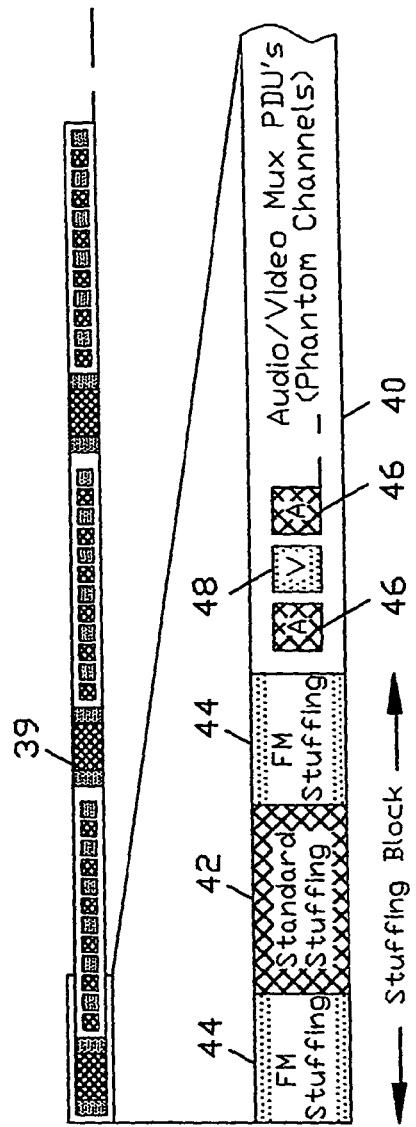
FIG. 3 illustrates a transmission of data in an embodiment of the present invention.

As illustrated in FIG. 3, the first terminal 12a which may support the first codec may transmit A/V Mux PDU's 40 to the second terminal 12b. A pattern of stuffing 39 may be interleaved with A/V Mux PDU's 40 in the transmission from the first terminal 12a to the second terminal 12b. The pattern of stuffing may have standard stuffing 42 and/or FM stuffing 44. The standard stuffing 42 may be a stuffing sequence for the Level 2 transmission and/or the Level 2 transmission with optional header. A minimum of twenty consecutive standard stuffing sequences may be transmitted from the first terminal 12a to the second terminal 12b. The FM stuffing 44 may replace the Mux Code with a value corresponding to at least one phantom channel 32, 34 with a pattern such as, for example, [A] 46, [V], 48, [A], 46 [V], 48. A minimum of four consecutive FM stuffing may be sequenced and/or may be transmitted from the first terminal 12a to the second terminal 12b. The A/V Mux PDU's 40 may be the data and/or the media which may be transmitted from the first terminal 12a to the second terminal 12b via the phantom channels 32, 34. The A/V Mux PDU's 40 may be transmitted via the Level 2 transmission and/or the Level 2 transmission with optional header. An initial repetition rate may be a duration of time between stuffing blocks and may not be more than, for example, two-hundred mS. A level setup may be completed and/or may be executed via the phantom channels 32, 34 which may be detected by the second terminal 12b. As a result, the first terminal 12a may terminate a transmission of a regular stuffing block and/or may initiate a transmission of a mixture of A/V Mux PDU 40 from the phantom channels 32, 34 and/or from the H.245 OLC.

The first terminal 12a may be operating in accordance with the default options as set forth above. After the phantom channels 32, may be established between the first terminal 12a and the second terminal 12b, the first terminal 12a may utilize and/or may select H.245 OLC procedures or other accelerated call negotiation procedures to establish regular channels between the first terminal 12a and the second terminal 12b. As a result, the phantom channels 32, 34 may be terminated by the first terminal 12a. To allow for an unambiguous transition by the second terminal 12b, the first terminal 12a may establish H.245-negotiated logical channel numbers and/or a multiplex table which may not conflict with the logical channel numbers and multiplex table entries being utilized by active phantom channels 32, 34. The first terminal 12a may reserve one multiplex table entry for each active phantom channel 32, 34. After the regular channels between the first terminal 12a and the second terminal 12b are established, the first terminal 12a may update an Mux table with a regular H.245 MES procedure, thus utilizing the previously reserved table entries.

The first terminal 12a may transmit the data and/or the media in the first codec before a receipt of the codec capability of the second terminal 12b. The second terminal 12b may not be capable to receive, to accept, to process and/or to dissimilate the data and/or the media in the first codec. As a result, the first terminal 12a may be required to switch, to change and/or to negotiate from a first codec to a second codec which may be acceptable and/or may be supported by the second terminal 12b. The second codec may be based on the codec capability which may be indicated in the control/transmission message 30.

The first terminal 12a may be capable to detect whether the data and/or the media in the first codec may be transmitting from the second terminal 12b to the first terminal 12a. The first terminal 12a may detect the FM stuffing sequences and/or the A/V Mux-PDU 40 of the phantom channels 32, 34 to determine whether the second terminal 12b may be transmitting the data and/or the media in the first codec. One or more synchronization techniques, such as, for example, a correlation search on incoming stuffing patterns may be used to determine whether the second terminal 12b may be transmitted the media in the first codec. After the phantom channels 32, 34 are detected, the first terminal 12a may begin to decode, to process and/or to display the data and/or the media in the first codec.

The second terminal 12b which may or may not accept the data and/or the media in the first codec may transmit a codec capability object in an H.245 TCS message. The codec capability object may indicate which codecs in the table in FIG. 4 are acceptable by the second terminal 12b. The first terminal 12a may utilize this information and/or other information to determine that the second terminal 12b may be incapable of processing and/or may not support the first codec of the data and/or the media. As a result, the first terminal 12a may terminate a transmission of the phantom channel or channels 32, 34 and/or may revert to an H.245 OLC negotiation. The first terminal 12a may receive the H.245 TCS message without codec capability object and/or without detecting the FM stuffing sequence 44 which may indicate to the first terminal 12a that the second terminal 12b may not support the first codec, and/or may not support the establishment of phantom channels. The first terminal 12a may transmit the H.245 TCS message with the codec capability object to indicate to the second terminal 12b whether the first codec may be supported and/or which codecs in the table of FIG. 4 may be acceptable by the first terminal 12a.

The system 10 may be compatible with a legacy terminal (not shown in the drawings) which may not support the establishment of phantom channels. The regular stuffing component to the stuffing block may be detectable by the legacy terminal which may be supporting an identical H.223 mode, such as, for example, Level 2 or Level 2 with optional header. The legacy terminal may detect the stuffing pattern and/or may transmit a same level transmission to the first terminal 12a. As a result, the first terminal 12a may detect the level match received from the legacy terminal and/or may proceed to execute the H.245 OLC negotiation. The legacy terminal may transmit a higher level transmission to the first terminal 12a. As a result, the first terminal 12a may detect the higher level transmission, may send stuffing at the higher level transmission, and/or may proceed to execute the H.245 OLC negotiation. The legacy terminal may transmit a lower level transmission and/or may wait for the first terminal 12a to adjust to a level acceptable by the legacy terminal.

The legacy terminal may not recognize the regular stuffing of the data and/or the media in the first codec transmitted from the first terminal 12a. The first terminal 12a may detect that the legacy terminal which may not support the first codec. The first terminal 12a may terminate a transmission of the phantom channels 32, 34 and/or may revert to the signaling which may be supported and/or may be accepted by the legacy terminal. Detection of incoming stuffing below Level 2 by the first terminal 12a may indicate that the legacy terminal may not support the first codec. The first terminal 12a may terminate transmission of the A/V signals and/or may switch to the lower level transmission for transmitting the data and/or the media to the legacy terminal.

To further illustrate the communication which may be possible under the present invention, we now present several examples of communication sessions which might occur between two suitable terminals 12a and 12b.

In a first example, the first terminal 12a may transmit an audio signal and/or a video signal which may be coded in, for example, the AMR codec and/or the MPEG-4 codec, respectively. The second terminal 12b may support receipt of, for example, the AMR codec and/or the MPEG-4 codec. As a result, an audio channel and/or a video channel transmitting the audio signal and/or the video signal to the second terminal 12b may be established.

In a second example, the first terminal 12a may transmit an audio signal and/or a video signal which may be coded in, for example, the AMR codec and/or the H.264 codec, respectively. The second terminal 12b may support the AMR codec of the audio signal but may be incapable of supporting the H.264 codec for the video signal. As a result, the audio channel transmitting the audio signal to the second terminal 12b may be established. The video channel for transmitting the video signal may have to be negotiated because the second terminal may be incapable to support the H.264 codec. If the second terminal 12b supports the MPEG-4 codec, a half round trip delay may occur as the first terminal 12a may receive the incoming TCS message from the second terminal 12b, and may switch the outgoing video signal from the H.264 codec to the MPEG-4 codec. Due to this negotiation, a half round trip delay to establish video transmission may occur in a video direction from the first terminal 12a to the second terminal 12b. Video transmission in the opposite direction may have been established immediately, without such a delay.

In the third example, the first terminal 12a may transmit the data and/or the media with Level 2 with optional header for stuffing and the second terminal 12b may transmit the data and/or the media with Level 2 without optional header. The first terminal 12a and the second terminal 12b may be required to parse the initial A/V PDU's regardless of whether the optional header may included. In this way, video phantom channel 32 and/or the audio phantom channel 34 may be established in both directions between the first terminal 12a and the second terminal 12b. Upon receipt of control/transmission messages 30 from the second terminal 12b, the first terminal 12a may discover that the second terminal 12b does not wish to use level 2 with optional header, and so the first terminal 12a may modify its transmission to remove the optional header.

In the fourth example, the first terminal 12a may transmit an audio signal and/or a video signal which may be coded in, for example, the AMR codec and/or the MPEG-4 codec, respectively. The second terminal 12b may support receipt of, for example, the AMR codec and/or the MPEG-4 codec. As a result, an audio phantom channel 32 and/or a video phantom channel 34 transmitting the audio signal and/or the video signal to the second terminal 12b may be established. The first terminal 12a may then choose to replace the video phantom channel 32 and/or the audio phantom channel 34 using an H.245 OLC negotiation message. As a result, a negotiated H.245 OLC may replace the video phantom channel 32 and/or the audio phantom channel 34. Such negotiation is not limited in principle to H.245, and so other improved techniques may be used to negotiate the replacement channels.

In the fifth example, the second terminal 12b may begin transmission of the data and/or the media to the first terminal 12a using phantom channels. The first terminal 12a may be a legacy terminal which may not support the establishment of phantom channels. The first terminal 12a may send and/or may transmit the TCS and/or the MSD to the second terminal 12b without synchronizing with the second terminal 12b. The second terminal 12b may determine that the first terminal 12a may not support the establishment of phantom channels, and may make this determination within a half round trip. As a result, the second terminal 12b may terminate a transmission of the data and/or the media in the phantom channels. The terminals 12a, 12b may exchange the TCS and/or the MSD and/or may proceed using the standard H.245 OLC negotiation. The retransmission protocol WNSRP and/or other enhanced call setup mechanisms may be used in this negotiation. As a result, the negotiated H.245 OLC's may be established between the terminals 12a, 12b.

In the sixth example, the first terminal 12a may transmit an accelerated call negotiation protocol stream to the second terminal 12b. The second terminal 12b may support the receipt of this accelerated call negotiation protocol stream and may indicate such support in the control/transmission message 30 sent from the second terminal 12b to the first terminal 12a. Upon receiving the control/transmission message 30, the first terminal 12a may determine that the second terminal 12b accepts, of processes and/or of uses the accelerated call negotiation protocol stream to negotiate media codecs. In this way, both terminals 12a and 12b may drop other initial media transmissions and/or may rely instead on the accelerated call control negotiation protocol for establishment of the initial media channels.

Note that for readability, the description and examples above focused on the flow of media or other data primarily in one direction, for example from the first terminal 12a to the second terminal 12b. It should be understood that the concepts, messages, and data flow may be applied in both directions, and that bi-directional data flow is a typical application of the ideas presented here.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A system for transmitting data, the system comprising:
a first terminal that supports a plurality of codecs for encoding and decoding the data; and
a second terminal that supports one or more codecs for encoding and decoding data;
wherein the first terminal is configured to select a first codec from the plurality of codecs, encode data via the selected first codec to produce first encoded data, and transmit, before determining decoding capabilities of the second terminal, the first encoded data and a first message to the second terminal, the first message identifying the plurality of codecs supported by the first terminal;
wherein the second terminal is configured to receive the first encoded data and the first message from the first terminal, and determine whether the first encoded data matches a codec of the one or more codecs supported by the second terminal;
wherein, if the first codec matches a codec of the one or more codecs supported by the second terminal, the second terminal is further configured to decode the first encoded data via the matched codec; and
wherein, if the first codec does not match a codec of the one or more codecs supported by the second terminal, the second terminal is further configured to select, based on the first message, a second codec that is supported by both the first terminal and the second terminal, encode data via the selected second codec to produce second encoded data, and transmit the second encoded data and a second message to the first terminal, the second message identifying the one or more codecs supported by the second terminal.

2. The system of claim 1 wherein:
the first terminal is further configured to determine, based on the received second message that the first encoded data does not match a codec supported by the second terminal; and
the first terminal is further configured to select a third codec based on the one or more codecs identified by the second message, discontinue transmission of the first encoded data, and encode data via the selected third codec to produce third encoded data, and transmit the third encoded data to the second terminal.

3. The system of claim 1 wherein the first terminal is configured to discontinue transmission of the first encoded data and negotiate data channels using H.245-based signaling in response to the first terminal determining that the second terminal is a legacy terminal which requires data channels to be negotiated using H.245-based signaling.

4. The system of claim 1 wherein the first terminal and the second terminal are mobile telephones.

5. The system of claim 1 wherein the first terminal and the second terminal communicate using the H.324 video telephony standard.

6. The system of claim 1 wherein the second message is an H.245 terminal capability set message.

7. The system of claim 1 wherein the second terminal displays the decoded first encoded data if the first encoded data matches a codec of the one or more codecs supported by the second terminal.

8. The system of claim 1 wherein the second message identifies the one or more codecs supported by the second terminal using indices from a predefined digital table.

9. The system of claim 1 wherein:
the first terminal and the second terminal are configured to participate in a video telephony session; and
the first encoded data represents one of audio communication and video communication from the first terminal to the second terminal in the video telephony session.

10. The system of claim 1 wherein the first encoded data is an H.245 based protocol stream for negotiating audio and video channels.

11. The system of claim 1 wherein:
the second terminal includes a predefined table comprising a plurality of entries, each entry specifying a codec and a configuration for the respective codec; and
the first terminal is configured to generate the first message such that the first message comprises one or more indices that identify the plurality of codecs supported by the first terminal via reference to one or more entries of the predefined table of the second terminal.

12. The system of claim 11 wherein the first terminal is configured to transmit the first encoded data per a pre-defined, pre-negotiated channel as specified by an entry of the predefined table for the first codec.

13. The system of claim 11 wherein the first terminal is configured to discontinue transmission of the first encoded data via the pre-defined, pre-negotiated channel for the first codec and transmit data to the second terminal via an established audio channel.

14. The system of claim 11 wherein the first terminal is configured to discontinue transmission of the first encoded data via the pre-defined, pre-negotiated channel for the first codec and transmit data to the second terminal via an established video channel.

15. The system of claim 1 wherein:
the second terminal is configured to generate the second message to include a stuffing pattern; and
the first terminal is configured to determine, based on the stuffing pattern received from the second terminal that the first encoded data does not match a codec supported by the second terminal.

16. The system of claim 1 wherein:
the first terminal includes a predefined table comprising a plurality of entries, each entry specifying a codec and a configuration for the respective codec; and
the second terminal is configured to generate the second message such that the second message comprises one or more indices that identify the one or more codecs supported by the second terminal via reference to one or more entries of the predefined table of the first terminal.

17. A method, comprising:
encoding data with a first codec of a plurality of codecs supported by a first terminal to produce first encoded data;
before determining decoding capabilities of the second terminal, transmitting, from the first terminal to the second terminal, the first encoded data and a first message identifying the plurality of codecs supported by the first terminal;
in response to said transmitting, receiving, from the second terminal, second encoded data and a second message identifying one or more codecs supported by the second terminal;
determining, with the first terminal, whether the first encoded data matches a codec supported by the second terminal based on the received second message from the second terminal; and
terminating transmission of the first encoded data in response to determining that the first encoded data does not match a codec supported by the second terminal.

18. The method of claim 17 further comprising:
determining, with the second terminal, whether the first encoded data matches a codec of the second terminal; and
in response to determining, with the second terminal, that the first encoded data matches a codec of the second terminal, decoding and displaying, with the second terminal, the first encoded data.

19. The method of claim 17 further comprising, in response to determining, with the first terminal, that the first encoded data does not match a codec of the second terminal:
selecting a second codec of the first terminal based on the second message received from the second terminal;
encoding data per the selected second codec to produce second encoded data; and
transmitting the second encoded data from the first terminal to the second terminal.

20. The method of claim 17 wherein the second message indicates data decoding capabilities of the second terminal using an ASN.1 encoded representation.

21. The method of claim 17 wherein the first terminal is a mobile telephone.

22. The method of claim 17 wherein said transmitting the first encoded data encoded comprises transmitting the first encoded data from the first terminal to the second terminal using an H.324 logical channel.

23. The method of claim 17 wherein said encoding produces first encoded data comprising an ASN.1 based protocol stream for call negotiation.

* * * * *